(12) United States Patent
Burton

(10) Patent No.: US 7,910,212 B1
(45) Date of Patent: *Mar. 22, 2011

(54) CONCRETE FLOOR FINISHING SYSTEM AND METHOD

(76) Inventor: Rodney Burton, Lutz, FL (US)

( * ) Notice: Subject to any disclaimer, the term of this patent is extended or adjusted under 35 U.S.C. 154(b) by 457 days.

This patent is subject to a terminal disclaimer.

(21) Appl. No.: 11/999,830

(22) Filed: Dec. 7, 2007

Related U.S. Application Data

(63) Continuation-in-part of application No. 11/061,154, filed on Feb. 18, 2005, now Pat. No. 7,311,974.

(51) Int. Cl.
*B32B 13/12* (2006.01)
*B32B 27/06* (2006.01)
*B32B 27/38* (2006.01)
*B32B 27/40* (2006.01)
*B05D 1/38* (2006.01)
*B05D 3/00* (2006.01)

(52) U.S. Cl. ............ 428/414; 428/413; 428/423.1; 428/543; 428/688; 427/402; 427/403; 427/407.1

(58) Field of Classification Search .............. None
See application file for complete search history.

(56) References Cited

U.S. PATENT DOCUMENTS

| | | | | |
|---|---|---|---|---|
| 5,637,236 A | * | 6/1997 | Lowe | 216/39 |
| 6,482,333 B1 | * | 11/2002 | Roesler et al. | 252/182.12 |
| 7,258,897 B1 | * | 8/2007 | Schindler et al. | 427/272 |
| 7,311,974 B1 | * | 12/2007 | Burton | 428/414 |
| 2004/0035329 A1 | * | 2/2004 | Sullivan | 106/709 |
| 2008/0276387 A1 | * | 11/2008 | Hertz et al. | 8/522 |

* cited by examiner

*Primary Examiner* — Michael J Feely
(74) *Attorney, Agent, or Firm* — Edward P Dutkiewicz

(57) ABSTRACT

An initial surface is provided. An overlay of colored grout is provided. The colored grout is on the initial surface. In this manner an intermediate surface is created. An acid stain is provided. The acid stain is on the intermediate surface. A two part clear epoxy resin is provided. The epoxy resin is provided on the intermediate surface. In this manner an exterior surface is created.

13 Claims, 4 Drawing Sheets

CONCRETE FLOOR FINISHING SYSTEM AND METHOD

CONTINUATION DATA

The present application is a continuation-in-part application of U.S. Ser. No. 11/061,154, filed Feb. 18, 2005, now U.S. Pat. No. 7,311,974.

BACKGROUND OF THE INVENTION

1. Field of the Invention

The present invention relates to a concrete floor finishing system and method and more particularly pertains to creating an elegant, care free floor in a safe and convenient manner.

2. Description of the Prior Art

The use of finishing processes of known designs and configurations is known in the prior art. More specifically, finishing processes of known designs and configurations previously devised and utilized for the purpose of providing a cover or sealant to concrete floors are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,341,396 issued Sep. 12, 1967 to Iverson relates to a marbleizing process and article. U.S. Pat. No. 4,859,504 issued Aug. 22, 1989 to Rossiter relates to a concrete finishing process. U.S. Pat. No. 4,959,250 issued Sep. 25, 1990 to McKinnon relates to simulated marble. Lastly, U.S. Pat. No. 5,248,338 issued Sep. 28, 1993 to Price relates to a colored marble concrete and method of producing same.

While these devices fulfill their respective, particular objectives and requirements, the aforementioned patents do not describe concrete floor finishing system and method that allows creating an elegant, care free floor in a safe and convenient manner.

In this respect, the concrete floor finishing system and method according to the present invention substantially departs from the conventional concepts and designs of the prior art, and in doing so provides an apparatus primarily developed for the purpose of creating an elegant, care free floor in a safe and convenient manner.

Therefore, it can be appreciated that there exists a continuing need for a new and improved concrete floor finishing system and method which can be used for creating an elegant, care free floor in a safe and convenient manner. In this regard, the present invention substantially fulfills this need.

SUMMARY OF THE INVENTION

In view of the foregoing disadvantages inherent in the known types of finishing processes of known designs and configurations now present in the prior art, the present invention provides an improved concrete floor finishing system and method. As such, the general purpose of the present invention, which will be described subsequently in greater detail, is to provide a new and improved concrete floor finishing system and method and method which has all the advantages of the prior art and none of the disadvantages.

To attain this, the present invention essentially comprises a floor. The floor has a concrete, substantially horizontal initial surface. The concrete floor has a top surface, or initial surface. The initial surface, or top surface of the concrete may be any shape, such as curved, angled, or in any shape.

An overlay of colored grout is provided. The colored grout is provided on the initial surface of the concrete. The colored grout is applied by hand troweling. In this manner character is added and a substantially horizontal intermediate surface is created. The colored grout forms an intermediate surface. The grout is allowed to dry. The colored grout is then ground by any commercially available surfacing means, such as a grinder. The grinding of the intermediate surface substantially removes any and all high spots of the dried intermediate surface.

Provided next is an acid stain. The term "acid stain" is a term of art in the floor coloring industry. Acid stains interact with the intermediate surface causing a coloration of the intermediate surface. Acid stains may provide any color surface. Some acid stains are marketed with the exact composition being a proprietary secret. For example "Black Stain", manufactured by Kemiko Corporation, comprises Manganese Chloride, Sodium Dichromate, Hydrochloric Acid and Water. "Aqua Blue Stain", manufactured by Kemiko Corporation, contains Phosphoric Acid, Cupric Chloride and Water, among other secret proprietary ingredients. In general, Acid Stains are combinations containing an acid, that react with the intermediate surface formed by the grout, and may be described as "acid based solutions". Acid stains may have colors mixed into the stain solution. Some acid stains have no color additive, but rely on the reaction with the grouted surface to provide the resultant coloration of the surface.

The acid stain is provided on the dried and ground intermediate surface. The acid stain remains on the grouted surface for a specified time interval, after which the acid stain is then neutralized using a base solution.

Further provided is a two part clear epoxy resin. The epoxy resin is applied to the neutralized intermediate surface. In this manner depth is provided and an exterior surface is created.

Provided last is an optional coat of a clear aliphatic urethane. The urethane is provided on the exterior surface. In this manner the hardness and durability are increased and a final surface is created.

The present invention, in addition to the floor system as described herein, also includes the method for creating the floor system as described herein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved concrete floor finishing system and method which has all of the advantages of the prior art finishing processes of known designs and configurations and none of the disadvantages.

It is another object of the present invention to provide a new and improved concrete floor finishing system and method which may be easily and efficiently manufactured and marketed.

It is further object of the present invention to provide a new and improved concrete floor finishing system and method which is of durable and reliable constructions.

An even further object of the present invention is to provide a new and improved concrete floor finishing system and method which is susceptible of a low cost of manufacture with regard to both materials and labor, and which accordingly is then susceptible of low prices of sale to the consuming public, thereby making such concrete floor finishing system and method economically available to the buying public.

Even still another object of the present invention is to provide a concrete floor finishing system and method for creating an elegant, care free floor in a safe and convenient manner.

Lastly, it is an object of the present invention to provide a new and improved concrete floor finishing system and method. An initial surface is provided. An overlay of colored grout is provided. The colored grout is on the initial surface. In this manner an intermediate surface is created. An acid stain is provided. The acid stain is on the intermediate surface. A two part clear epoxy resin is provided. The epoxy resin is provided on the intermediate surface. In this manner an exterior surface is created.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
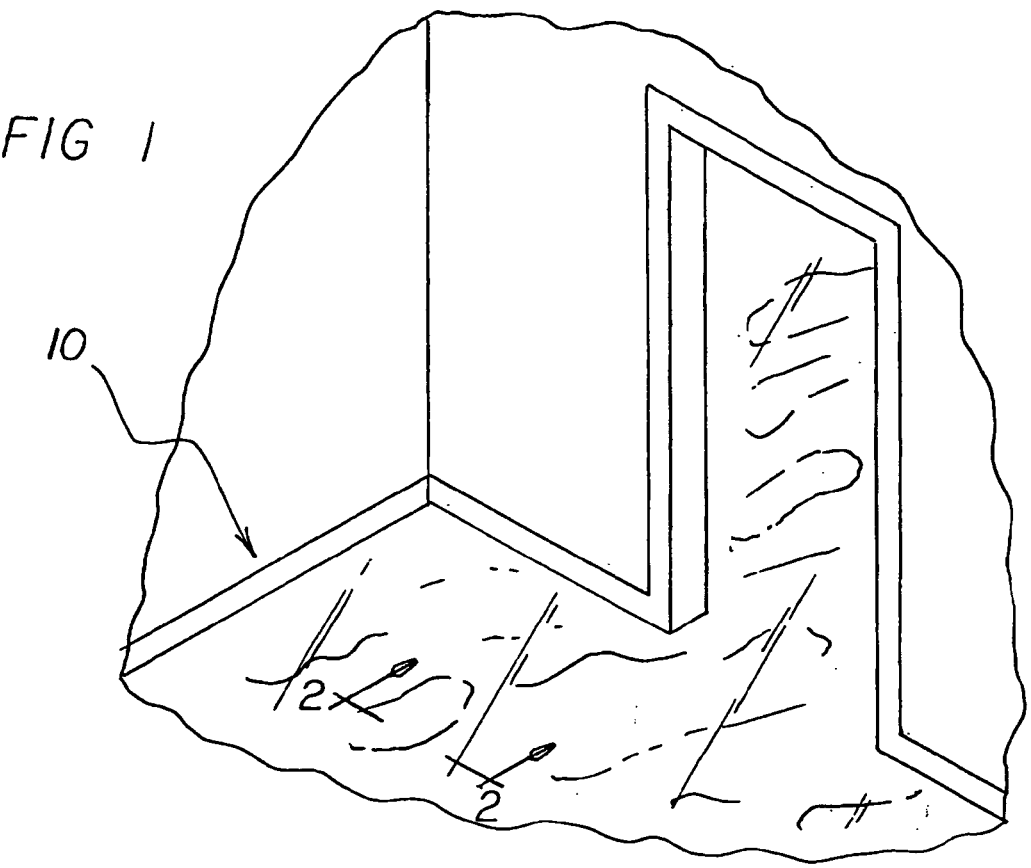
FIG. 1 is a perspective illustration of a concrete floor finishing system constructed in accordance with the principles of the present invention.
Figure 2:
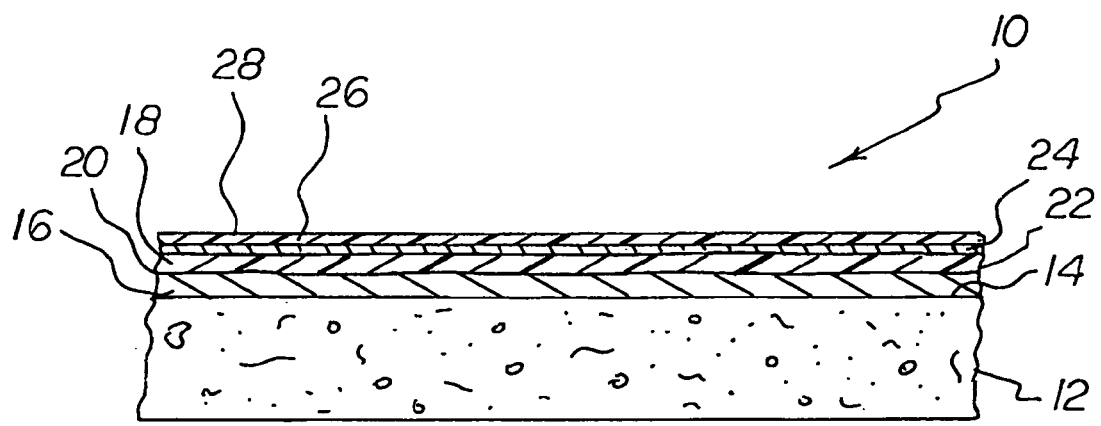
FIG. 2 is a cross sectional view taken along line 2-2 of FIG. 1.
Figure 3:
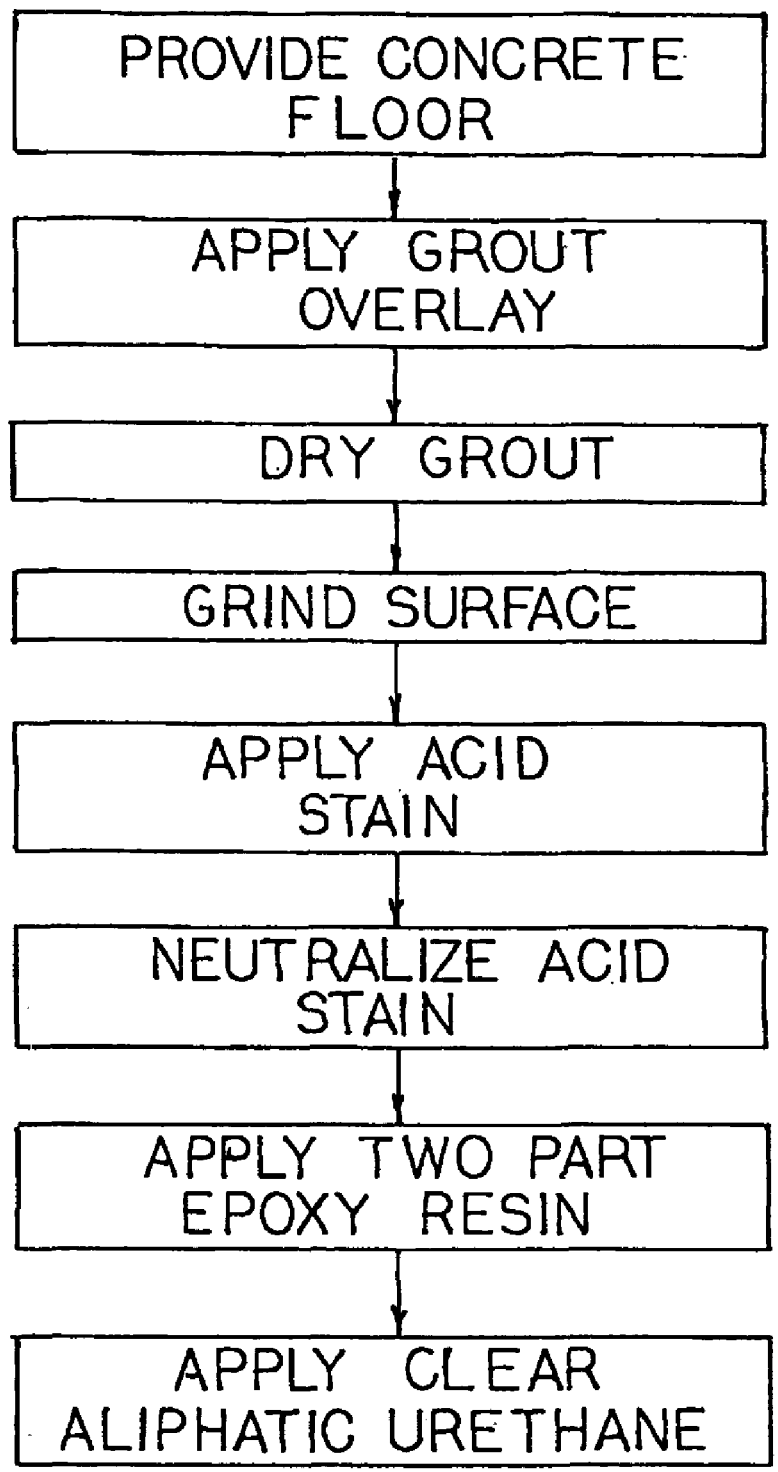
FIG. 3 is a flow diagram of the method steps for performing the method of the present invention.
Figure 4:
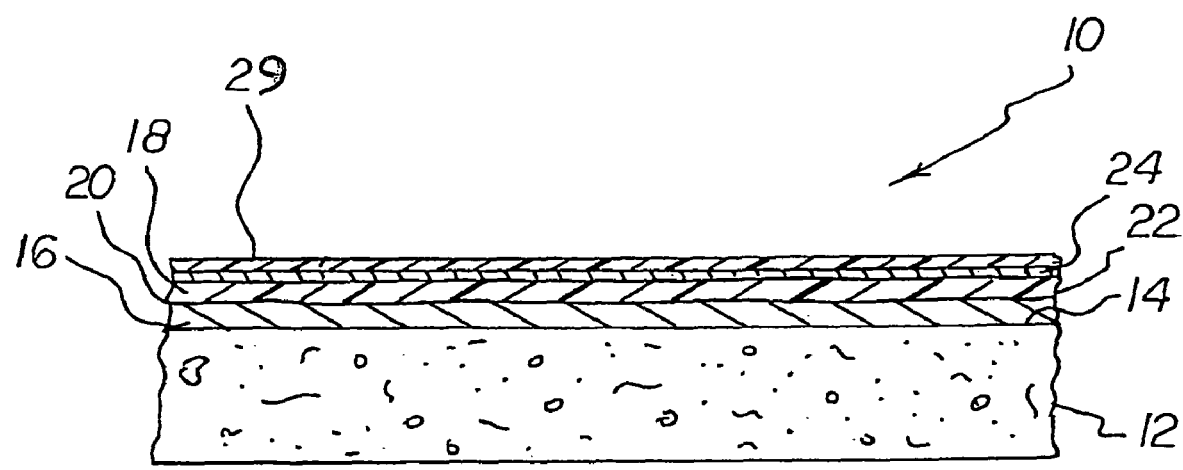
FIG. 4 is a cross sectional view taken along line 2-2 of FIG. 1 showing another embodiment in which a sealer layer is used.
Figure 5:
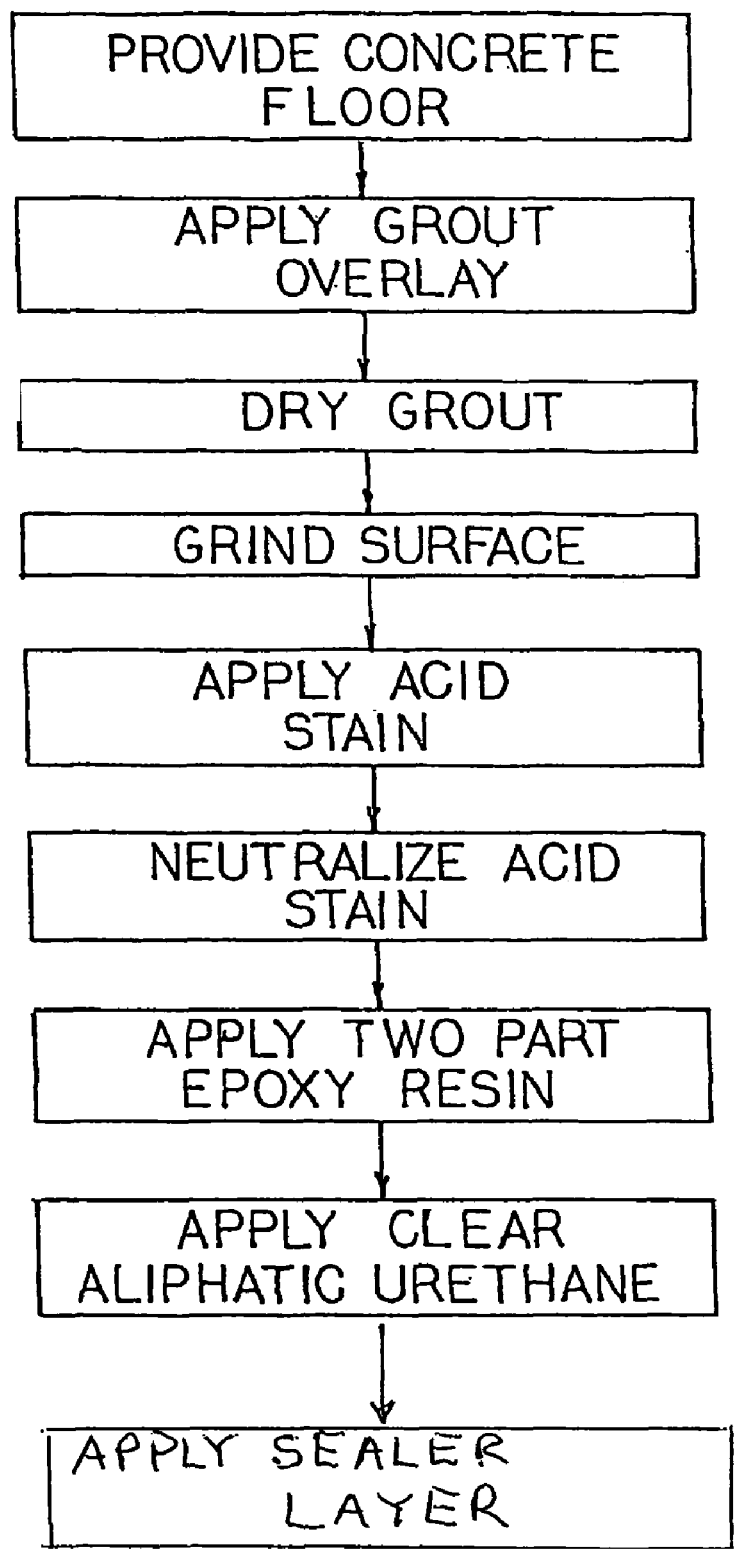
FIG. 5 is a flow diagram of the method steps for performing the method of the present invention wherein a sealer layer is used.

With reference now to the drawings, and in particular to FIG. 1 thereof, the preferred embodiment of the new and improved concrete floor finishing system and method embodying the principles and concepts of the present invention and generally designated by the reference numeral 10 will be described.

The present invention, the concrete floor finishing system and method 10 is comprised of a plurality of components. Such components in their broadest context include an initial surface, an overlay of colored grout, an acid stain and a two part clear epoxy resin. Such components are individually configured and correlated with respect to each other so as to attain the desired objective.

First provided in the floor system of the present invention is a floor 12. The floor has a concrete, substantially horizontal initial surface 14.

In another embodiments the initial surface may be any surface, such as wood, plywood, particle board, ceramic tile, cement board and gypsum board. Along with concrete, all of the above will be referred to a hard stable surface.

The herein described process may be used to produce a durable surface on all types of surfaces, such as wall panel surfaces, tile surfaces, counter-top surfaces, and tabletop surfaces. Together, the initial surfaces, upon which the process and system may be used, may be referred to as a recipient surface.

An overlay of colored grout 16 is provided. The colored grout is provided on the initial surface. The colored grout is applied by hand troweling. The grout may be applied by using a squeegee or stand up trowel.

In this manner character is added and a substantially horizontal intermediate surface 18 is created. The colored grout of the intermediate surface is allowed to dry. The colored grout is then ground substantially abating any and all high spots of the dried intermediate surface, thereby forming a finished intermediate surface.

Provided next is an acid stain 20. The acid stain is provided on the dried and ground intermediate surface. The acid stain is then neutralized after a first predetermined period of time. Because the coloration is related to the acid and the time allowed for the acid to react with the grout intermediate surface, the coloration varies with the amount of time that the acid is left to react with the grout intermediate surface.

Further provided is a two part clear epoxy resin 22. The epoxy resin is applied to the neutralized intermediate surface. In this manner depth is provided and an exterior surface 24 is created.

Provided last is an optional coat of a clear aliphatic urethane 26. The urethane is provided on the exterior surface. In this manner the hardness and durability are increased and a final surface 28 is created.

In another embodiment an acrylic sealer may be used to form a protective surface over the exterior surface. The acrylic sealer forms an acrylic surface.

In still another embodiment an epoxy sealer may be used to form a protective surface over the exterior surface. The epoxy sealer forms an epoxy surface.

Collectively, aliphatic urethane, acrylic sealer, and epoxy sealer are referred to as a final, or top, surface 29.

In still another embodiment, the acrylic sealer may be directly applied to the stained grout, without using an epoxy or urethane final surface. The advantage of not employing the urethane or epoxy final surface is a cost consideration. The acrylic sealer may also be applied as the final surface in combination with epoxy or urethane. In this application the acrylic sealer becomes the final surface, without the use of a urethane or epoxy surface on the grout before the use of the acrylic sealer.

In a final embodiment the grout is placed over the initial hard surface, such as wood, synthetic, or concrete. The grout is treated, or covered with an acid stain, dye, pigment, paint, or any combination thereof. A sealer, such as an epoxy, as a final sealer or intermediary to the urethane, or urethane as a final sealer, or acrylic as final sealer, or polyaspartic as a final sealer is placed to cover the surface, becoming the final, most exterior surface.

In addition to the system as described above, the present invention also includes the method of creating an elegant, care free floor in a safe and convenient manner comprising.

The first step in the method of the present invention is providing a floor with a concrete, substantially horizontal initial surface.

The second step is applying an overlay of colored grout onto the initial surface. The colored grout is applied by hand troweling. In this manner character is added and a substantially horizontal intermediate surface is created.

The third step is allowing the colored grout of the intermediate surface to dry.

The fourth step is grinding substantially any and all high spots of the dried intermediate surface.

The fifth step is applying an acid stain to the dried and ground intermediate surface.

The sixth step is neutralizing the acid stain of the dried and ground intermediate surface.

The seventh step is applying a two part clear epoxy resin to the neutralized intermediate surface. In this manner depth is provided and an exterior surface is created.

The last step is applying an optional coat of a clear aliphatic urethane. The urethane is applied on the exterior surface. In this manner the hardness and durability are increased and, if desired, a final surface is created.

In another embodiment of this above described method, a sealer, such as an epoxy, as a final sealer or intermediary to the urethane, or urethane as a final sealer, or acrylic as final sealer, or polyaspartic as a final sealer is placed to cover the surface, becoming the final, most exterior surface.

In still another embodiment, an acrylic sealer may be used to form a protective surface over the exterior surface. The acrylic sealer forms an acrylic surface.

In still another embodiment an epoxy sealer may be used to form a protective surface over the exterior surface. The epoxy sealer forms an epoxy surface.

Collectively, aliphatic urethane, acrylic sealer, and epoxy sealer are referred to as a final, or top, surface.

In still another embodiment of the system, various substances may be added to the intermediate grout layer to produce colors and textures, in the grout intermediate layer. Such substances are members of the class of substances that includes dyes, non-acid stains, pigments and paints.

Prior to the present invention, acid stained floors have been normally sealed with polyurethane. Such finish is pleasing to the eye until it is subjected to wear. Polyurethane is very susceptible to wear. To protect polyurethane top coats, sacrificial top coats of wax are normally utilized. Such surfaces of wax normally require constant care, buffing and polishing and occasional stripping with re-waxing. Scuff marks are an ongoing problem. The sealer of the present invention is the toughest on the market. No waxing is ever needed. The floor stays gorgeous with just an occasional damp mop or the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A finishing system comprising:
   a recipient surface;
   an intermediate surface, formed by an overlay of colored grout on the recipient surface;
   an acid stain on the intermediate surface;
   an exterior surface, formed by an epoxy layer on the intermediate surface; and
   a final surface, formed by a layer of polyaspartic on the exterior surface.

2. A concrete floor finishing system comprising, in combination:
   a concrete floor recipient surface;
   an intermediate surface, formed by applying an overlay of colored grout onto the concrete floor recipient surface by hand troweling in order to add character, allowing the colored grout to dry, and subsequently grinding the dry colored grout;
   an acid stain on the intermediate surface, formed by applying an acid stain composition onto the intermediate surface and neutralizing the acid stain composition after a first period of time;
   an exterior surface, formed by applying a two part clear epoxy resin onto the acid stain to provide depth; and
   a final surface, formed by applying a coat of a clear aliphatic urethane onto the exterior surface, thereby increasing hardness and durability.

3. The concrete floor finishing system as set forth in claim 2, further comprising a sealer finish, formed by applying a coat of acrylic sealer onto the final surface to protect the clear aliphatic urethane coat.

4. The concrete floor finishing system as set forth in claim 2, further comprising a sealer finish, formed by applying a coat of epoxy sealer onto the final surface to protect the clear aliphatic urethane coat.

5. The concrete floor finishing system as set forth in claim 2, wherein the concrete floor recipient surface is a substantially flat concrete floor.

6. A method for applying a floor finish comprising, in combination:
   providing a recipient floor surface;
   applying an overlay of colored grout onto the recipient floor surface, allowing the colored grout to dry, and grinding the dry colored grout to form an intermediate surface;
   applying an acid stain composition onto the intermediate surface and neutralizing the acid stain composition after a first period of time to form an acid stain; and
   applying a two part clear epoxy resin onto the acid stain to form an exterior surface and to provide depth.

7. The method for applying a floor finish as set forth in claim 6, further comprising: applying a coat of a clear aliphatic urethane onto the exterior surface to form a final surface and to increase hardness and durability.

8. The method for applying a floor finish as set forth in claim 7, further comprising: applying a coat of acrylic sealer onto the final surface to form a sealer finish and to protect the clear aliphatic urethane coat.

9. The method for applying a floor finish as set forth in claim 7, further comprising: applying a coat of epoxy sealer onto the final surface to form a sealer finish and to protect the clear aliphatic urethane coat.

10. A concrete floor finishing system comprising, in combination:

a concrete floor recipient surface;

an intermediate surface, formed by applying an overlay of colored grout onto the concrete floor recipient surface by hand troweling in order to add character, allowing the colored grout to dry, and subsequently grinding the dry colored grout;

an acid stain on the intermediate surface, formed by applying an acid stain composition onto the intermediate surface and neutralizing the acid stain composition after a first period of time; and a sealer finish, formed by applying a coat of sealer onto the acid stain, thereby increasing hardness and durability.

11. The concrete floor finishing system as set forth in claim 10, wherein the sealer is an acrylic sealer.

12. The concrete floor finishing system as set forth in claim 10, wherein the sealer is a polyaspartic sealer.

13. The concrete floor finishing system as set forth in claim 10, wherein the sealer is a urethane sealer.

* * * * *